(12) United States Patent
Kowalski

(10) Patent No.: US 11,522,414 B2
(45) Date of Patent: Dec. 6, 2022

(54) SPEED-REGULATED EXTERNAL FANS FOR THE TEMPERATURE-CONTROLLED THROUGHPUT VENTILATION OF TURBOGENERATORS, PHASE SHIFTERS, AND ROTATING ELECTRICAL MACHINES FOR NETWORK STABILIZATION

(71) Applicant: Siemens Engergy Global Gmbh & Co. KG, Munich (DE)

(72) Inventor: Matthias Kowalski, Mülheim an der Ruhr (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 260 days.

(21) Appl. No.: 17/027,984

(22) Filed: Sep. 22, 2020

(65) Prior Publication Data
US 2021/0091636 A1 Mar. 25, 2021

(30) Foreign Application Priority Data
Sep. 25, 2019 (DE) ...................... 10 2019 214 677.5

(51) Int. Cl.
| | |
|---|---|
| *H02K 9/06* | (2006.01) |
| *H02K 11/25* | (2016.01) |
| *H02P 29/60* | (2016.01) |
| *H02P 29/64* | (2016.01) |
| *H02P 29/66* | (2016.01) |

(52) U.S. Cl.
CPC .............. *H02K 9/06* (2013.01); *H02K 11/25* (2016.01); *H02P 29/60* (2016.02); *H02P 29/64* (2016.02); *H02P 29/66* (2016.02)

(58) Field of Classification Search
CPC .......... H02K 9/06; H02K 11/25; H02P 29/60; H02P 29/64; H02P 29/66
USPC ...................................................... 318/3, 558
See application file for complete search history.

(56) References Cited

U.S. PATENT DOCUMENTS

| | | | |
|---|---|---|---|
| 5,557,153 A * | 9/1996 | Zimmermann .......... | H02K 9/06 310/58 |
| 8,786,237 B2 * | 7/2014 | Sato ..................... | H01L 23/467 318/67 |
| 10,749,452 B2 * | 8/2020 | Kaidu ....................... | H02P 5/68 |
| 2011/0002358 A1 * | 1/2011 | Sato ..................... | H05K 1/0201 374/163 |

* cited by examiner

*Primary Examiner* — David Luo

(57) ABSTRACT

In a rotating electrical machine, in particular a generator, different components, such as, for example, rotor, stator rod and end zone, are cooled as required by associated external fans, whereby the cooling power requirement is reduced. The method for cooling includes a plurality of cooling fans arranged for cooling different components of the machine, wherein a cooling fan is individually controlled in its cooling performance in accordance with the temperature of the associated component.

11 Claims, 1 Drawing Sheet

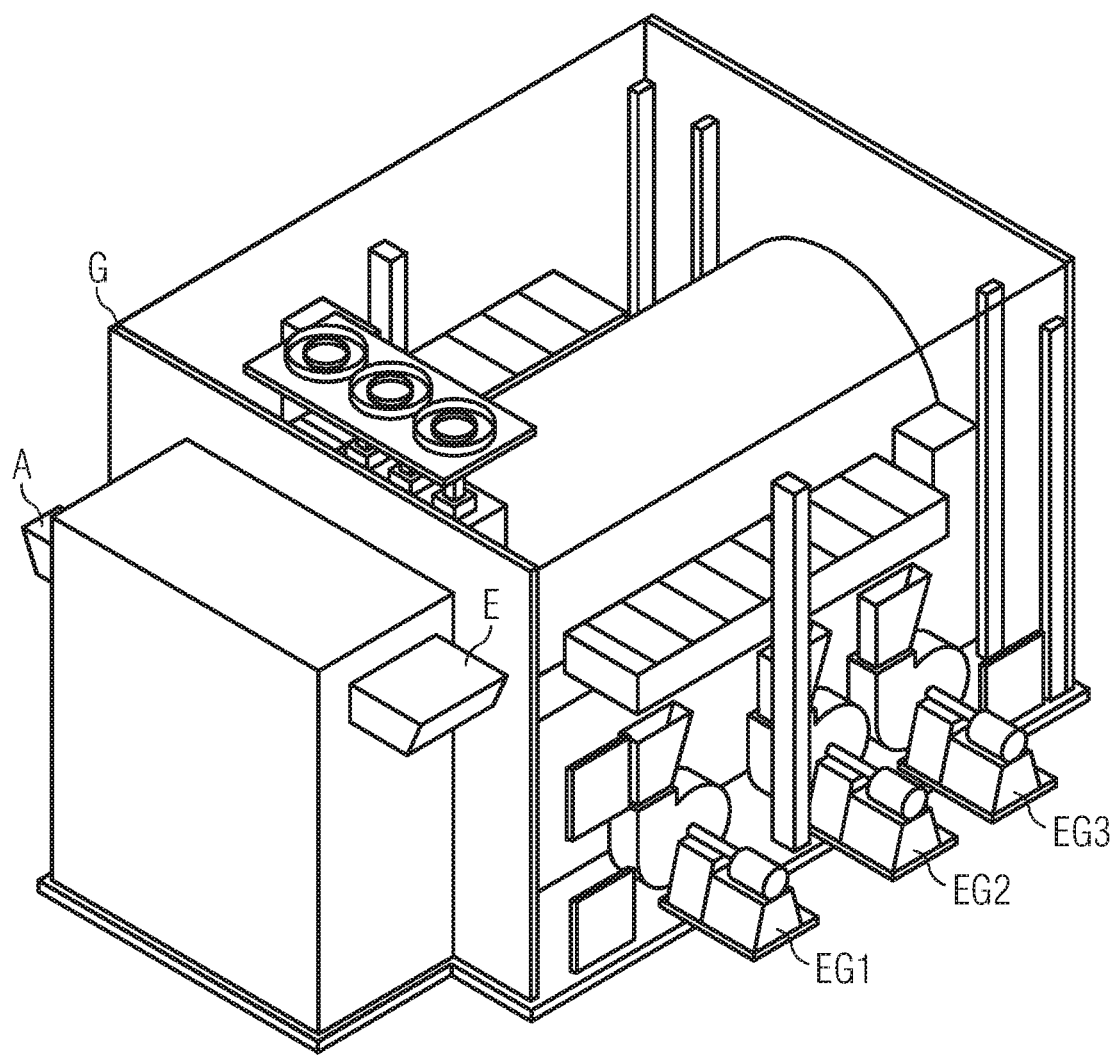

SPEED-REGULATED EXTERNAL FANS FOR THE TEMPERATURE-CONTROLLED THROUGHPUT VENTILATION OF TURBOGENERATORS, PHASE SHIFTERS, AND ROTATING ELECTRICAL MACHINES FOR NETWORK STABILIZATION

CROSS REFERENCE TO RELATED APPLICATIONS

This application claims the benefit of German Application No. DE 10 2019 214 677.5 filed 25 Sep. 2019, incorporated by reference herein in its entirety.

FIELD OF INVENTION

The invention relates to a method for cooling a rotating electrical machine, in particular a generator.

BACKGROUND OF INVENTION

In turbogenerators it is generally the case that fan blades, whose setting angle cannot be changed during operation, are situated fixedly on the fan hub of the rotor shaft. The speed is generally constant at 50 Hz or 60 Hz. The disadvantage resulting therefrom is the constant (maximum) power consumption even at low load points which are accompanied per se by low losses. In a widespread design type, the cooling gas is conveyed in a closed circuit and gives off heat to gas coolers.

There is also the variant with a plurality of external fans EG1, EG2, EG3 which convey the cooling medium—along with the axial fans—in a circuit.

In addition to the closed cooling circuit described at the outset, there also exist open cooling systems (throughput ventilation). Here, the ambient air is used for convective heat dissipation and—instead of recooling it in a gas cooler—it is blown out of the machine again. The heat exchange takes place directly with the air from the environment by continuous exchange.

The possibility of configuring external fans (for example in a speed-controlled manner) is known. Here, the efficiency is improved (with a corresponding reduction in power loss) in part-load operation.

Through all approaches, either the integral volumetric flow is fixedly defined in the design or set by a speed regulation, this being accompanied by a predetermined power consumption of the fans in all cases described.

SUMMARY OF INVENTION

The problem addressed by the invention is that of further reducing the power consumption for cooling a rotating electrical machine.

The problem is solved by subject matter having the features of the independent claim.

The invention makes use of the finding that, depending on the load case, other components of the machine experience heating.

The invention combines a throughput ventilation and external fans with the proposed regulating algorithm that allows requirement-appropriate control over the local temperatures of the machine with a power input which is low as far as possible. The temperature regulation is based here on the measurement of the ambient air and internal temperature sensors+virtual sensors or a digital twin and exerts influence on the delivery rate of the individual fans. As a result, local volumetric flows and not the integral volumetric flow are regulated.

Only the advantages of the regulation and of the interaction but not of the individually known systems will be discussed here:

The power consumption in each load case (particularly part load) is reduced from the local convective cooling. This is advantageous particularly for phase shifters and rotating electrical machines for network stabilization, since a load case-related factoring in of at least 5500 € per kilowatt/year loss occurs.

Thus, for example, the saving of 60 kW fan power would afford a cash value advantage of 330 000 € per year. It is possible through the targeted knowledge of the local temperatures (measuring sensors+virtual sensors or digital twin) for thermomechanical stressing (which results from different component temperatures and thermal cycles) to be reduced in a requirement-appropriate manner.

Advantageous developments of the invention are specified in the dependent claims.

BRIEF DESCRIPTION OF THE DRAWINGS

The invention will be explained in more detail below as an exemplary embodiment in a scope required for understanding on the basis of a FIGURE, in which:

FIG. 1 shows a conventional variant of a generator in which a plurality of external fans convey the cooling medium in a circuit.

DETAILED DESCRIPTION OF INVENTION

The solution according to the invention provides for external fans to be realized in combination with a throughput ventilation. Here, the fans convey the air out of the machine to the outside or from the environment into the interior of the machine.

The advantage of drawing the gas out of the machine consists in the fact that the temperature increase due to the fan itself is not at the expense of the cold gas temperature.

The advantage of blowing in air consists in the better controllability of the volumetric flow (for example fan outlet A through piping upstream of rotor cap). Furthermore, a filter unit (dust separator or the like) is provided at the inlet points E (independent of the position of the fans). The inlet and outlet points are distributed on the housing (for example in the winding head region or at a plurality of points on the back of the laminated core). It is possible by targeted mounting of the inlet and outlet points and, where appropriate, by the additional use of piping or gas chambers in the generator for the volumetric flow to be controlled and governed better still.

In addition to the already individual, known advantages of the throughput ventilation and of the external fans, there results here a further possibility of further increasing the efficiency. Since, in different operating regimes, the machine heats at different points, but also components (for example under-excites→end zone, over-excites→rotor, high effective power→stator bar), the various regulatable external fans can then be activated individually and in a load case-related manner in order to maintain, but also not to exceed, certain temperature levels. In addition, the cold gas temperature (ambient temperature +where appropriate a temperature increase due to fans) can be taken into consideration.

There is proposed a regulatory system which, with the aid of given measuring probes (such as for example slot resistance thermometers), virtual sensors and/or continuous calculation of a digital twin, controls the external fans in such a way that no local hot spots occur and the power consumption is low as far as possible. Furthermore, the system can be used in a targeted manner to reduce thermomechanical stressing, since the local temperatures in the machine can be kept constant.

The present invention has been explained in detail for illustrative purposes on the basis of specific exemplary embodiments. Here, elements of the individual exemplary embodiments can also be combined with one another. The invention is therefore not intended to be limited to individual exemplary embodiments but only to be limited by the appended claims.

The invention claimed is:

1. A method for cooling a turbogenerator, wherein the machine has a housing (G) and a throughput ventilation type cooling system, the method comprising:
   arranging a plurality of cooling fans (EG1, EG2, EG3) for respective cooling with cooling air of different components of the turbogenerator, and
   individually controlling a cooling power of a cooling fan of the plurality of cooling fans according to a temperature of an associated component of the turbogenerator.

2. The method as claimed in claim 1, further comprising:
   a guide element which guides the cooling air from the cooling fan to the associated component which is to be cooled.

3. The method as claimed in claim 1, further comprising:
   a guide element which guides the cooling air from the associated component to be cooled to the cooling fan.

4. The method as claimed in claim 1,
   wherein the cooling air flows through a filter device at an inlet (E) of the housing.

5. The method as claimed in claim 1,
   wherein the temperature of a component to be cooled is detected by a measuring probe.

6. The method as claimed in claim 1,
   wherein the temperature of a component to be cooled is detected by a slot resistance thermometer.

7. The method as claimed in claim 1,
   wherein the temperature of a component to be cooled is detected by a virtual sensor.

8. The method as claimed in claim 1,
   wherein the temperature of a component to be cooled is detected by continuous calculation of a digital twin.

9. The method as claimed in claim 1,
   wherein a cooling fan is controlled in its cooling power while observing an admissible temperature of the associated component in such a way that a power consumption of the cooling fan is low as far as possible.

10. The method as claimed in claim 1,
    wherein the plurality of cooling fans are individually controlled in their cooling power according to a load case of the turbogenerator.

11. The method as claimed in claim 1,
    wherein the components are provided from the group consisting of rotor, stator bar and end zone.

* * * * *